(12) United States Patent
Johnson

(10) Patent No.: US 9,793,833 B1
(45) Date of Patent: Oct. 17, 2017

(54) DYNAMIC BRAKING OF AN ELECTRIC MOTOR USING CAPACITIVE LOAD CHARGING

(71) Applicant: Jonathan David Johnson, Seaside, CA (US)

(72) Inventor: Jonathan David Johnson, Seaside, CA (US)

(73) Assignee: Jonathan Johnson, Marma, CA (US)

( * ) Notice: Subject to any disclaimer, the term of this patent is extended or adjusted under 35 U.S.C. 154(b) by 29 days.

(21) Appl. No.: 15/158,611

(22) Filed: May 19, 2016

(51) Int. Cl.
  *H02P 3/14* (2006.01)
  *H02P 1/00* (2006.01)
  *B60L 11/18* (2006.01)

(52) U.S. Cl.
  CPC ............. *H02P 3/14* (2013.01); *B60L 11/1887* (2013.01)

(58) Field of Classification Search
  CPC .......................................................... H02P 3/14
  USPC ........................................................... 318/376
  See application file for complete search history.

(56) References Cited

U.S. PATENT DOCUMENTS

| | | | |
|---|---|---|---|
| 8,076,883 B2 * | 12/2011 | Wallner | B60L 11/1887 318/139 |
| 2010/0123352 A1 * | 5/2010 | Elleman | H02J 7/0063 307/66 |

* cited by examiner

*Primary Examiner* — Bentsu Ro
*Assistant Examiner* — Zemenay Truneh

(57) ABSTRACT

The invention disclosed herein is an energy recovery system, for an electric motor, that uses the properties of dynamic braking to directly recharge a capacitive load made up of energy storage devices. The system contains switching circuitry that configures the energy storage devices into a capacitive load when braking is needed. Otherwise, the system configures the energy storage devices into a power supply for regular motor operation.

5 Claims, 3 Drawing Sheets

DYNAMIC BRAKING OF AN ELECTRIC MOTOR USING CAPACITIVE LOAD CHARGING

BACKGROUND OF THE INVENTION

An electric motor is more energy efficient, has more torque, and weighs less than an equivalent fuel burning engine. However, a motor's electrical energy storage supply is often an inferior source of stored energy, making it difficult to effectively replace an engine with a motor.

Electrical energy storage devices are often expensive, large, heavy, and volatile. As a result, over the years these power supplies have become smaller and lighter in order to increase the power to weight ratio. Moreover, there have been several attempts to recover wasted energy, and one of the most prominent sources of wasted energy is braking.

The braking methods for an electric motor usually consist of either frictional, plugging, dynamic, or regenerative braking and each has it's own strengths and weaknesses. Presently, frictional braking is the most reliable. It slows the motor down by converting the motor's kinetic energy into heat, but this kind of mechanism adds weight and requires regular maintenance. Plugging is the use of additional energy to reverse the motor's rotation; which is effective, but also the most wasteful. Dynamic braking and regenerative braking both use the motor's back electromotive force, which reverses the current flow to stop the rotation. Now, even though regenerative braking converts some of the kinetic energy back into electrical energy, the conditions necessary to use this braking method have often hindered its practical use. And while tradition methods of dynamic braking are effective, they do not convert the kinetic energy back into electrical energy.

BRIEF SUMMARY OF THE INVENTION

Since most motor driven machinery use a frictional braking system that wastes energy and adds extra weight. It is an object of the present invention to reduce waste and weight with a simple system that combines dynamic and regenerative braking by taking advantage of the unique characteristics of both electric motors and energy storage devices. Basically this system uses switching circuitry to connect small energy storage devices in parallel, forming a load for dynamic braking. Then it reconnects them in series, to create a power supply for the motor's thrust. All of which saves space, weight, and energy over traditional methods.

Any additional objects, advantages, and novel features of the invention will become apparent upon examination of the following specification, or will be learned through the practice of the present invention.

DETAILED DESCRIPTION OF THE INVENTION

The present invention can best be understood by associating descriptions to possible applications; hence, this description will refer to the attached diagrams in detail.

Figure 1A:
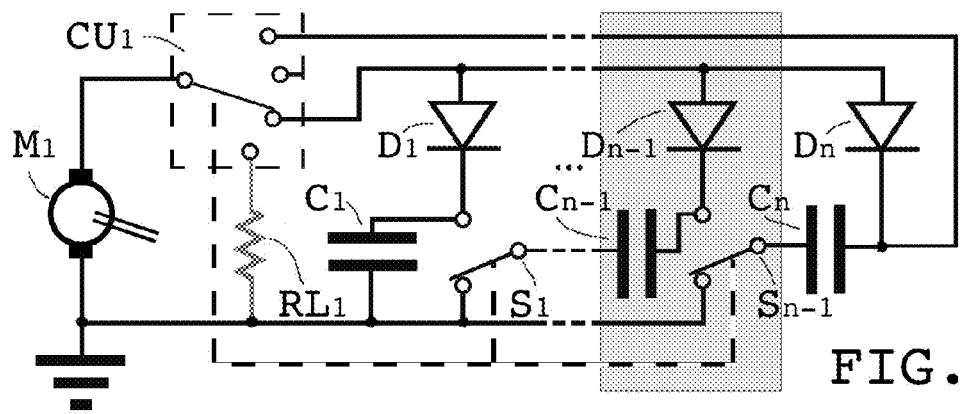
FIG. 1A is a simplified circuit diagram of the present invention showing it in the braking mode of operation. In this configuration the energy storage devices are acting like a resistive load for the motor (M1), while also being recharged by the current flow.

FIG. 1A is a simplified circuit diagram of the present invention representing the braking mode of operation. In braking mode the control unit (CU1) routes the current from the motor (M1) to a series of energy storage cells, each consisting of a diode (Dn-1), a capacitor (Cn-1), and a control switch (Sn-1). The diode, in the design, is used to prevent a discharging current flow when the motor is not spinning fast enough to charge the capacitor. During the braking process, the energy storage devices (C1 to Cn) act like a resistive load for the motor (M1) creating enough back electromotive force to slow the motor's rotation. The amount of back electromotive force is proportional to the amount of current flowing though the capacitors (C1 to Cn). The number of capacitive devices are calculated using the desired maximum braking force and are designated by the value of n in the figure. For obvious reasons the first control switch and last control switch in the series are replaced by an equivalent short circuit in this diagram.

Figure 1B:
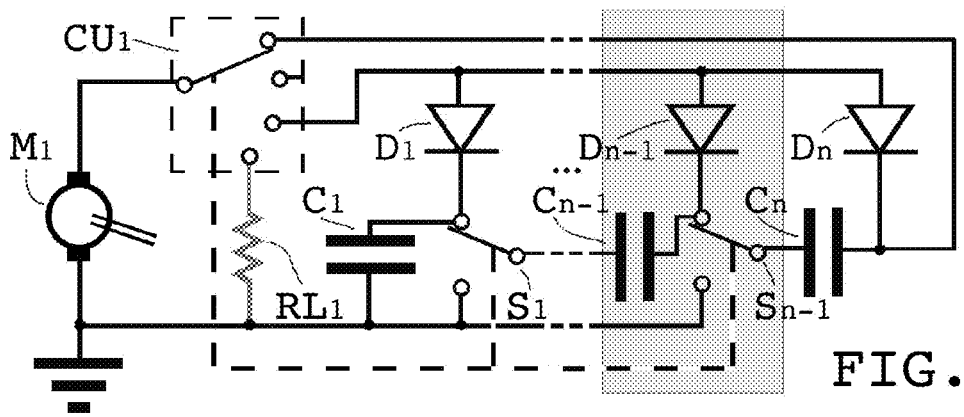
FIG. 1B is the diagram of FIG. 1A with the energy storage devices configured as the power supply for the motor (M1).

FIG. 1B shows the circuit diagram of FIG. 1A in drive mode where the control unit (CU1) routes the discharge current from the energy storage devices (C1 to Cn), to the motor (M1), while they are configured as a power supply.

Figure 1C:
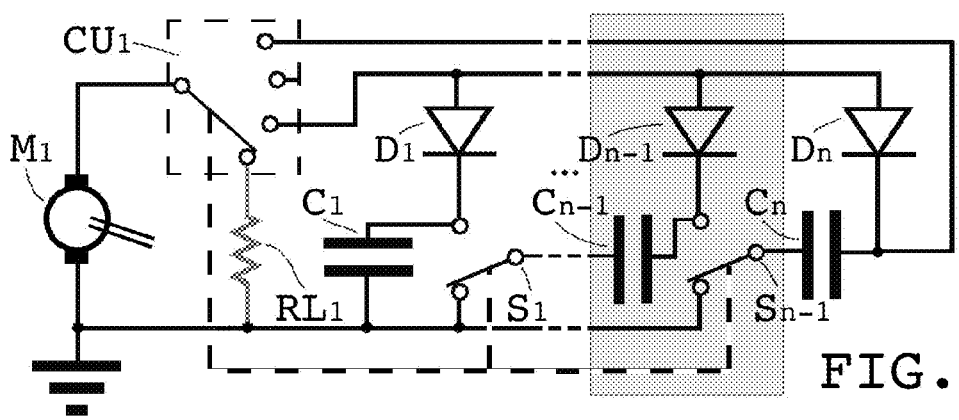
FIG. 1C shows the motor (M1) using a bypass load resistor (RL1) when the speed of the motor is too low to charge the capacitors.

FIG. 1C shows the motor (M1) using a bypass load resistor (RL1) when the speed of the motor is too low to charge the energy storage devices (C1 to Cn). Basically allowing the motor (M1) to act as a parking brake.

Figure 2:
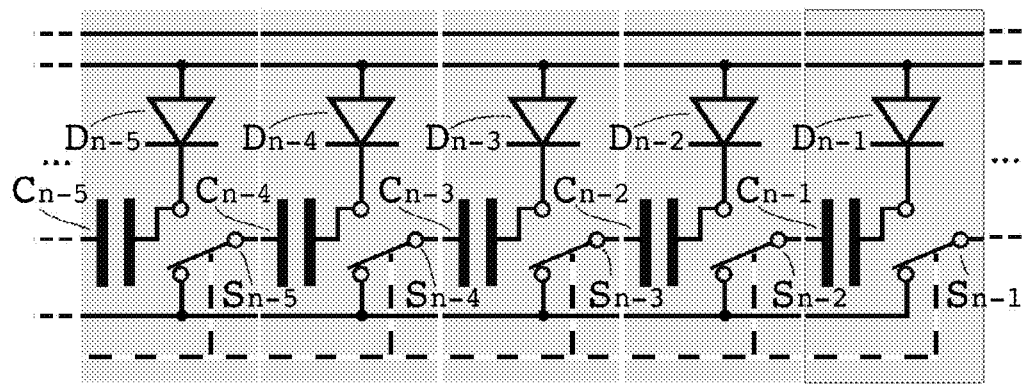
FIG. 2 shows how repetitive cell sections are used to create the desired load for dynamic braking conditions.

FIG. 2 is a simplistic example of how repetitive cell sections are used to adjust for the desired load. Each additional cell section lowers the resistive value, which increases current flow.

Figure 3:
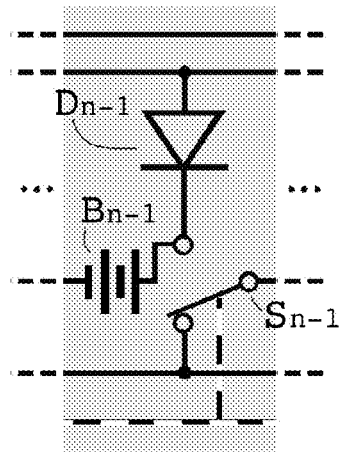
FIG. 3 shows a single repetitive cell section with a rechargeable battery (Bn-1) as the energy storage device.

FIG. 3 shows an alternate circuit diagram subsection of the invention that takes advantage of the similar properties of a capacitor and a battery (Bn-1) enabling them to become interchangeable in the energy storage cell.

Figure 4:
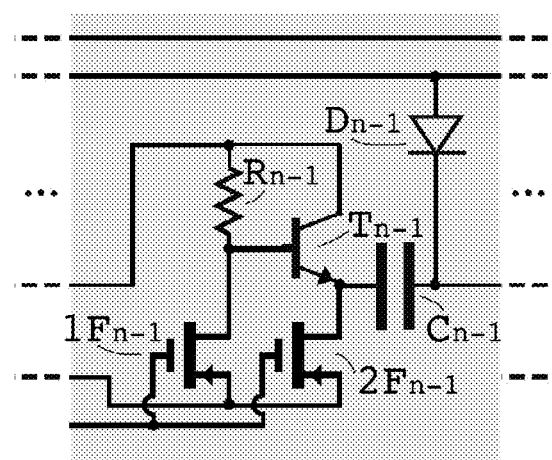
FIG. 4 is a circuit diagram of a repetitive cell section wherein the switching is done by transistors.

FIG. 4 is an alternate subsection circuit diagram showing the switch of the energy storage cell functionally constructed using transistors (Tn-1, 1Fn-1, & 2Fn-1) and a resistor (Rn-1). This particular design is useful for low voltage and current conditions where certain transistor combinations will not trigger.

Figure 5:
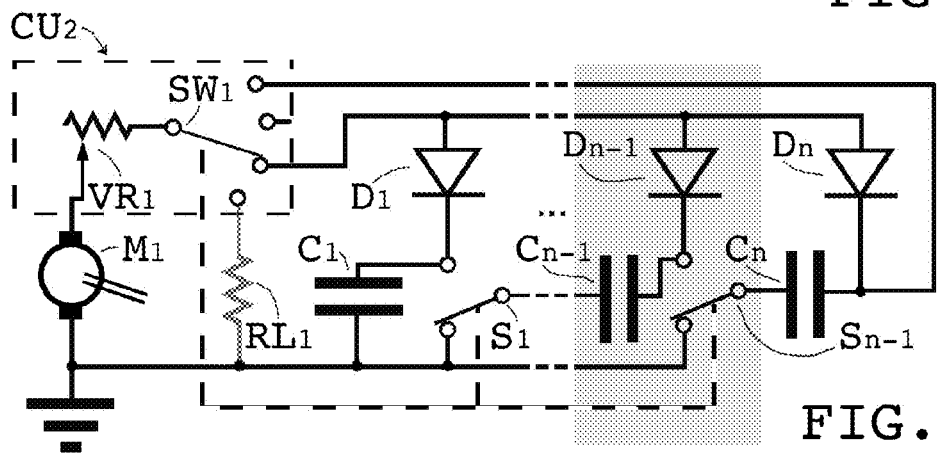
FIG. 5 shows an alternate embodiment of FIG. 1A wherein the control unit (CU2) includes a variable resistance (VR1), enabling motor speed control.

FIG. 5 shows an alternate embodiment of FIG. 1A wherein the control unit (CU2) includes a variable resistance (VR1) to alter the speed of the motor (M1). Having this resistance on the motor (M1) side of the selector switch (SW1) enables the control unit to vary both the speed of the motor in drive mode and the braking force in braking mode.

Figure 6:
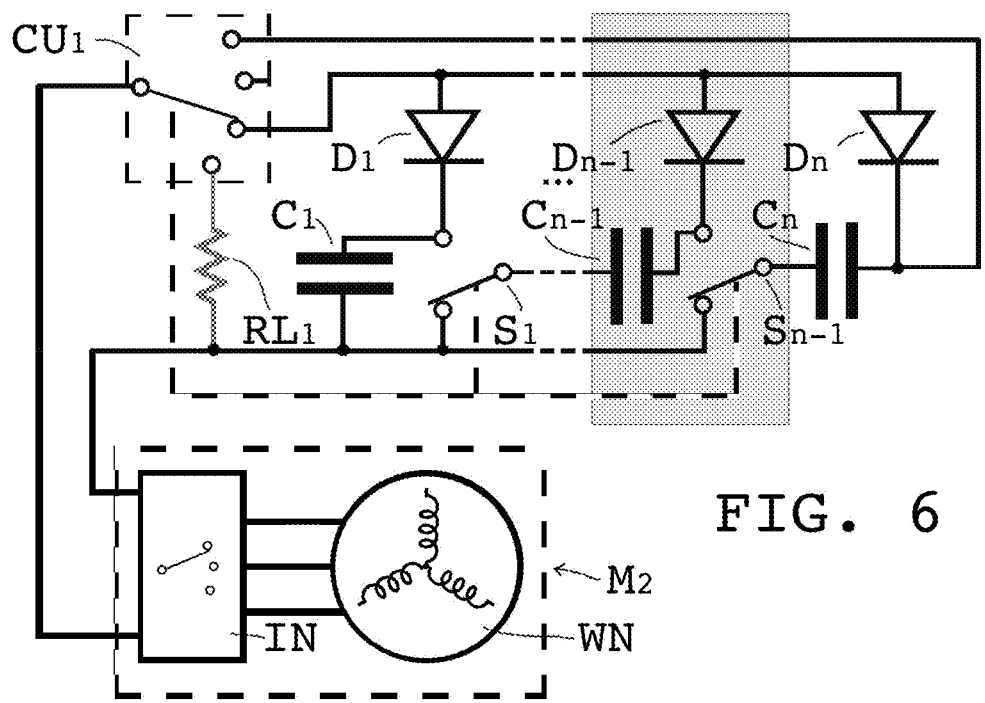
FIG. 6 shows an alternate embodiment of FIG. 1A with a synchronous motor (M2) replacing the DC motor (M1).

FIG. 6 shows an alternate embodiment of FIG. 1A wherein the invention uses a synchronous motor (M2) that includes an inverter (IN) and windings (WN) in a star or Y-connection.

Figure 7:
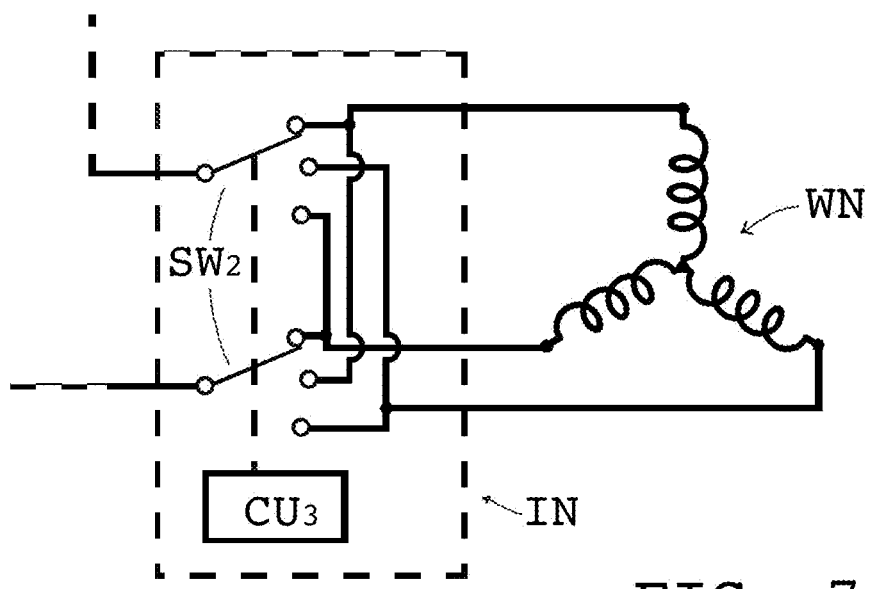
FIG. 7 is a simplified diagram of a possible synchronous motor (M2) for FIG. 6 and it's inverter (IN).

FIG. 7 is a simplified circuit diagram of a possible synchronous motor for FIG. 6 and it's inverter. The inverter consists of a switching mechanism (SW2) that uses a position and speed control unit (CU3) to direct the current to or from the appropriate set of windings (WN) for the most efficient use of power.

The invention claimed is:

1. An energy recuperating system that uses control switches and circuitry to produce modes of operation that include a dynamic braking mode and a drive mode;

the dynamic braking mode uses electrical energy storage devices connected in parallel, as a capacitive load, to cause a connected electric motor to brake;

simultaneously, the connected electric motor creates an electric current that charges the capacitive load; however, in drive mode the electrical energy storage devices are connected in series to form a power source for the connected electric motor.

2. The energy recuperating system of claim 1, wherein the control switches and circuitry include an option to maintain dynamic braking conditions when the induced voltage is too low for the electrical energy storage devices to charge.

3. The energy recuperating system of claim 2, wherein the control switches and circuitry use transistors.

4. The energy recuperating system of claim 1, wherein the control switches and circuitry use transistors.

5. The energy recuperating system of claim 1, 2, 4, or 3, wherein the electrical energy storage devices are batteries.

* * * * *